United States Patent
Ficara et al.

(10) Patent No.: US 11,882,581 B2
(45) Date of Patent: Jan. 23, 2024

(54) WIRELESS MIRROR DEVICE FOR MITIGATING MULTIPATH INTERFERENCE BETWEEN TRANSMITTER AND RECEIVER DEVICES USING DISTINCT TRANSMIT FREQUENCY

(71) Applicant: Cisco Technology, Inc., San Jose, CA (US)

(72) Inventors: Domenico Ficara, Essertines-sur-Yverdon (CH); Amine Choukir, Lausanne (CH); Pascal Thubert, Roquefort les Pins (FR); Malcolm Smith, Richardson, TX (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 398 days.

(21) Appl. No.: 17/176,549

(22) Filed: Feb. 16, 2021

(65) Prior Publication Data

US 2022/0264581 A1 Aug. 18, 2022

(51) Int. Cl.
*H04W 72/541* (2023.01)
*H04W 72/0453* (2023.01)

(52) U.S. Cl.
CPC ..... *H04W 72/541* (2023.01); *H04W 72/0453* (2013.01)

(58) Field of Classification Search
None
See application file for complete search history.

(56) References Cited

U.S. PATENT DOCUMENTS

| 9,859,970 B2 | 1/2018 | Thubert et al. |
| 10,038,608 B2 | 7/2018 | Thubert et al. |
| 10,225,789 B2 | 3/2019 | Thubert et al. |
| 10,244,525 B2 | 3/2019 | Thubert et al. |
| 10,524,194 B2 | 12/2019 | Thubert et al. |
| 2005/0256972 A1 | 11/2005 | Cochran et al. |
| 2008/0212532 A1 | 9/2008 | Heo et al. |

(Continued)

OTHER PUBLICATIONS

Cisco, "Cisco IOS Configuration Guide for Autonomous Cisco Aironet Access Points—Release 15.3(3)JE and later", Nov. 11, 2020, [online], [retrieved on Feb. 2, 2021]. Retrieved from the internet: URL: <https://www.cisco.com/c/en/us/td/docs/wireless/access_point/atnms-ap-8x/configuration/guide/cg-book/cg-chap-misc-spec-APs.html>, pp. 1-39.

(Continued)

*Primary Examiner* — Srinivasa R Reddivalam
(74) *Attorney, Agent, or Firm* — BEHMKE INNOVATION GROUP LLC; James M. Behmke; James J. Wong (57) ABSTRACT

In one embodiment, a method comprises: detecting, by a wireless mirror device in a wireless data network, link layer transmission of a wireless data unit between a wireless access point (AP) device and a wireless client device on a first allocated frequency channel at a first transmission interval; and transmitting, by the wireless mirror device based on detecting the link layer transmission, the wireless data unit at a second transmission interval on a second allocated frequency channel that is allocated to the wireless mirror device for a mirror transmission between the wireless AP device and the wireless client device at the second transmission interval.

16 Claims, 6 Drawing Sheets

(56) References Cited

U.S. PATENT DOCUMENTS

| | | | |
|---|---|---|---|
| 2010/0005360 A1 | 1/2010 | Begen et al. | |
| 2012/0087300 A1* | 4/2012 | Seok | H04W 76/10 |
| | | | 370/315 |
| 2013/0336184 A1* | 12/2013 | Kwon | H04W 72/30 |
| | | | 370/312 |
| 2014/0254471 A1* | 9/2014 | Fang | H04W 84/047 |
| | | | 370/329 |
| 2014/0280829 A1 | 9/2014 | Kjendal et al. | |
| 2017/0094552 A1* | 3/2017 | Yang | H04W 28/0236 |
| 2018/0213566 A1 | 7/2018 | Baron et al. | |
| 2020/0366544 A1* | 11/2020 | Hormis | H04L 5/0053 |
| 2022/0104101 A1* | 3/2022 | Elshafie | H04W 72/20 |

OTHER PUBLICATIONS

Actiontec Electronics, Inc., "WiFi 6 802.11ax Network Extender", [online], [retrieved on Feb. 2, 2021]. Retrieved from the Internet: URL: <https://www.actiontec.com/products/home-networking/wireless-extenders/web7100/>, pp. 1-8.

Chandra et al., U.S. Appl. No. 16/680,684, filed Nov. 12, 2019.

Zhang et al., U.S. Appl. No. 16/574,295, filed Sep. 18, 2019.

Sliverman et al., U.S. Appl. No. 17/154,131, filed Jan. 21, 2021.

* cited by examiner

WIRELESS MIRROR DEVICE FOR MITIGATING MULTIPATH INTERFERENCE BETWEEN TRANSMITTER AND RECEIVER DEVICES USING DISTINCT TRANSMIT FREQUENCY

TECHNICAL FIELD

The present disclosure generally relates to a wireless mirror device for mitigating multipath interference between transmitter and receiver devices using a distinct transmit frequency.

BACKGROUND

This section describes approaches that could be employed, but are not necessarily approaches that have been previously conceived or employed. Hence, unless explicitly specified otherwise, any approaches described in this section are not prior art to the claims in this application, and any approaches described in this section are not admitted to be prior art by inclusion in this section.

Wireless deployment of Industrial Internet of Things (IIoT) devices provides particular challenges, as such IIoT devices are resource constrained in terms of limited battery supply, limited processing capacity, limited storage capacity, and limited wireless transceiver capabilities (including limited transmit power and limited receiver gain): such IIoT devices are resource constrained due to requirements such as low cost, low throughput, and low power consumption requirements that are limited to battery-only operation for ten to fifteen (10-15) years or more. Deployment of large-scale wireless mesh networks (e.g., according to IEEE 802.15.4) often suffer from high loss rates, low data rates, and instability with relatively low packet delivery rates.

IEEE 802.11 ("Wi-Fi") based wireless networks are being considered for IIoT deployments due to the relative availability of low wireless coverage cost (per square foot) and service provider independence. However, IEEE 802.11 based wireless networks still suffer from reduced reliability, particularly due to multipath interference that can be encountered between an IEEE 802.11 based wireless access point (AP) device and a wireless network device that is associated with the wireless AP device. Multipath interference is unpredictable, and a reflected wireless signal can be sufficiently out-of-phase from the original line-of-sight signal that the resulting multipath interference can cancel the original line-of-sight signal, rendering any transmissions undetectable by the associated receiver device.

BRIEF DESCRIPTION OF THE DRAWINGS

Reference is made to the attached drawings, wherein elements having the same reference numeral designations represent like elements throughout and wherein.

DESCRIPTION OF EXAMPLE EMBODIMENTS

Overview

In one embodiment, a method comprises: detecting, by a wireless mirror device in a wireless data network, link layer transmission of a wireless data unit between a wireless access point (AP) device and a wireless client device on a first allocated frequency channel at a first transmission interval; and transmitting, by the wireless mirror device based on detecting the link layer transmission, the wireless data unit at a second transmission interval on a second allocated frequency channel that is allocated to the wireless mirror device for a mirror transmission between the wireless AP device and the wireless client device at the second transmission interval.

In another embodiment, an apparatus is implemented as a physical machine and comprises a device interface circuit, and a processor circuit. The device interface circuit is configured for detecting link layer transmission of a wireless data unit between a wireless access point (AP) device and a wireless client device on a first allocated channel at a first transmission interval in a wireless data network. The processor circuit is configured for causing the device interface circuit to transmit, based on detecting the link layer transmission, the wireless data unit at a second transmission interval on a second allocated frequency channel that is allocated to the apparatus for a mirror transmission between the wireless AP device and the wireless client device at the second transmission interval.

In another embodiment, one or more non-transitory tangible media is encoded with logic for execution by a machine and when executed by the machine operable for: detecting, by the machine implemented as a wireless mirror device in a wireless data network, link layer transmission of a wireless data unit between a wireless access point (AP) device and a wireless client device on a first allocated frequency channel at a first transmission interval; and transmitting, by the wireless mirror device based on detecting the link layer transmission, the wireless data unit at a second transmission interval on a second allocated frequency channel that is allocated to the wireless mirror device for a mirror transmission between the wireless AP device and the wireless client device at the second transmission interval.

Detailed Description

Particular embodiments provide substantially improved reliability in successful wireless transmissions of link layer wireless data units (e.g., MAC frames, physical layer protocol data units (PPDUs), etc.), based on deploying wireless mirror (WM) devices within IEEE 802.11 based wireless networks. According to example embodiments, each wireless mirror device can provide mirror transmissions between a wireless access point (AP) device and one or more wireless client devices (e.g., stations or STA) that are associated with the wireless access point (AP) device. The wireless mirror (WM) device is neither a wireless AP device nor a wireless client device; rather, the wireless mirror (WM) device is a distinct wireless device that has link layer capabilities (link layer "intelligence" for MAC "awareness") that enables the wireless mirror device to execute a mirror transmission of a wireless data unit between a wireless client device and its associated AP device.

The wireless mirror device can receive instructions from the wireless access point (AP) device that indicate one or more resource units (RUs) allocated for link layer transmission of a wireless data unit between the wireless AP device and a wireless client device on a first allocated frequency channel at a first transmission interval, enabling the wireless mirror device to detect the link layer transmission of the wireless data unit; the wireless mirror device can receive further instructions from the wireless AP device identifying one or more mirroring RUs that are allocated for the wireless mirror device to execute mirror transmission of the wireless data unit at a second transmission interval on a "rotated" second allocated frequency channel.

The mirror transmissions can include a link layer transmission, on a "rotated resource unit", of a wireless data unit that is detected by the wireless mirror device during transmission on a first resource unit to a wireless AP device by a wireless client device associated with the wireless AP device; the mirror transmissions also can include link layer transmission, on a corresponding rotated resource unit, of a second wireless data unit detected by the wireless mirror device during transmission on a second resource unit to the wireless client device by its associated wireless AP device.

Hence, the example wireless mirror device can mitigate against any multipath interference encountered between a wireless AP device and one or more wireless client devices based on providing time diversity, frequency diversity, and spatial diversity of link layer transmissions in the form of a mirror transmission of the wireless data unit between the wireless AP device and one or more wireless client devices. The wireless mirror device also can receive instructions for executing selected mirroring for an identified subset of link layer traffic, for example according to source address, destination address, Quality of Service (QoS) class, flow identifier, etc. Hence, the wireless mirror device can be controlled according to the scheduling policies established by the wireless AP device.

In addition, the example wireless mirror device can be implemented in a link layer topology without any modification or adjustment to any layer 3 routing protocols, as the wireless mirror device can be operable as a PHY layer and MAC layer-only device that has no presence in any layer 3 routing topology.

Figure 1:
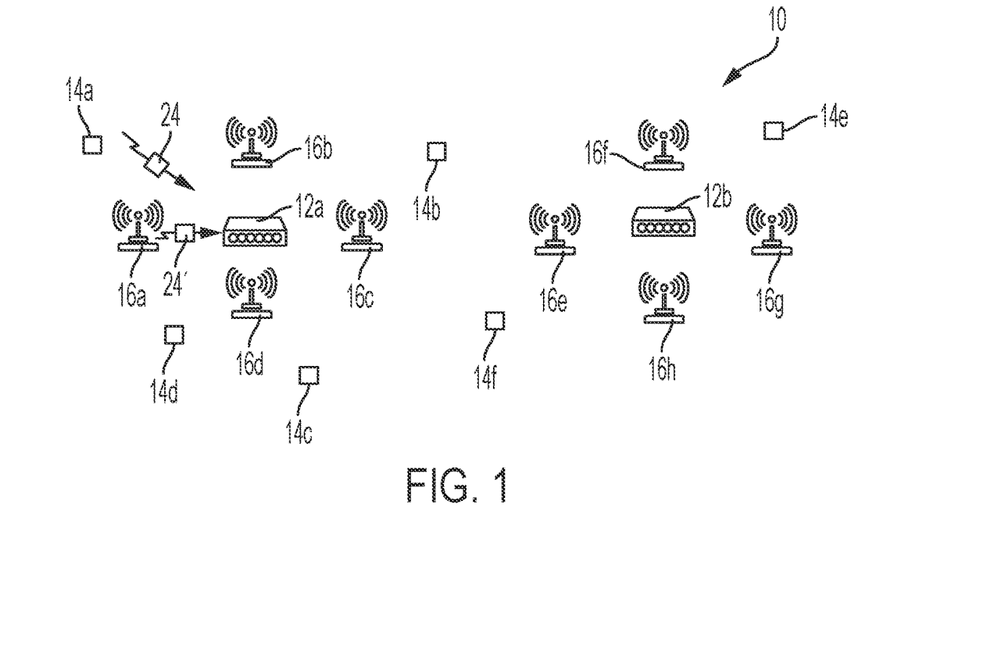
FIG. 1 illustrates an example system having a wireless mirror device executing a mirror transmission based on detecting link layer transmission of a wireless data unit by a wireless client device to the wireless AP device, and transmitting the wireless data unit to the wireless AP device using a different allocated frequency channel, according to an example embodiment.

FIG. 1 is a diagram illustrating an example wireless local area network (WLAN) 10 having one or more wireless AP devices 12, one or more wireless client devices or "stations" (STAs) 14, and one or more wireless mirror devices 16, according to an example embodiment. The wireless AP devices 12a and 12b can be connected via a wired connection (not shown) to one or more network devices (not shown), for example a router, a network switch, a wireless LAN controller, etc., for centralized management of the WLAN 10 according to existing link layer or network layer protocols. The WLAN 10 also can be connected to other network devices for communications with remote devices via a wide area network (not shown).

As described in further detail below, each wireless AP device 12, wireless client device 14, and wireless mirror device 16 is configured for operating according to IEEE 802.11ax: each wireless client device 14 associates with an identified wireless AP device 12, and each wireless mirror device 16 associates with an identified wireless AP device 12; as illustrated in FIG. 1, the wireless client devices 14a, 14b, 14c and 14d can associate with the wireless AP device 12a, and the wireless client devices 14e and 14f can associate with the wireless AP device 12b.

One or more wireless mirror devices 16 can be positioned at different physical locations within the WLAN 10 to provide a distributed "mirroring" of wireless transmissions of a wireless data unit 24 between a wireless client device 14 and its associated wireless AP device 12: the positioning of the one or more wireless mirror devices 16 provides a spatial diversity by providing an additional link layer (MAC-layer) "presence" in the WLAN 10; hence, the spatial diversity provided by a wireless mirror device 16 can mitigate location-sensitive multipath interference encountered by wireless signals between a wireless client device 14 and its associated wireless AP device 12.

As described below, each wireless mirror device 16 also can provide time diversity based on mirror transmission 24' of a wireless data unit 24 on a different transmission interval (20b of FIG. 2); each wireless mirror device 16 also can provide frequency diversity based on the mirror transmission 24' of the wireless data 24 unit on a different allocated frequency channel 22. The time diversity and frequency diversity can be based on a rotated resource unit (18 of FIG. 2) relative to an original resource unit used for initial transmission of a wireless data unit 24. Hence, a wireless mirror device 16 can mitigate against any multipath interference encountered between a wireless client device 14 and its wireless AP device 12 based on simultaneously providing spatial diversity, frequency diversity, and time diversity during mirror transmission 24' of a wireless data unit 24 that was previously transmitted between a wireless client device 14 and its associated wireless AP device 12.

Figure 2:
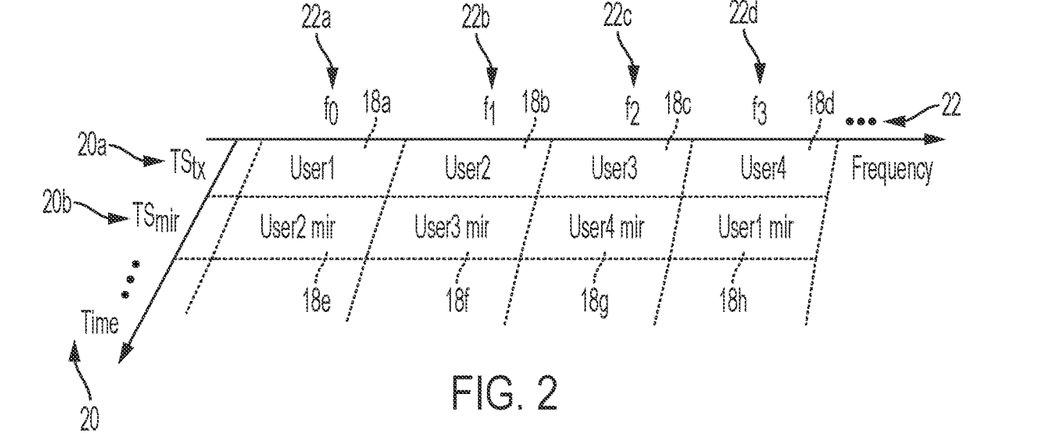
FIG. 2 illustrates example resource unit rotation between wireless client devices and wireless mirror devices transmitting to a wireless AP device, according to an example embodiment.

FIG. 2 illustrates example resource unit rotation between wireless client devices 14 and one or more wireless mirror devices 16 for transmission of a wireless data unit 24 between a wireless AP device 12, according to an example embodiment. Each wireless AP device 12 can transmit to each wireless client device 14 and each wireless mirror device 16 one or more instructions specifying allocation of resource units (RUs) 18, illustrated in FIG. 2, that allocate transmit opportunities (TXOP) for each associated device 14 and/or 16. For example, the wireless AP device 12a can transmit instructions that allocate the resource units 18a, 18b, 18c, and 18d to the wireless client devices "User1" 14a, "User2" 14b, "User3" 14c, and "User4" 14d, respectively.

As illustrated in FIG. 2, the resource units 18a, 18b, 18c, and 18d can cause the wireless client devices 14a, 14b, 14c, and 14d to transmit, at the first transmission interval "$TS_{fx}$" 20a, respective wireless data units 24 to the wireless AP device 12a at the allocated frequency channels "$f_0$" 22a, "$f_1$"22b, "$f_2$"22c, and "$f_3$" 22d, respectively. Assuming hypothetically that no multi-path interference is encountered between the wireless client devices 14a, 14b, 14c, and 14d and the wireless AP device 12a, the wireless AP device 12a theoretically would receive without error the respective wireless data units 24 transmitted within the respective resource units 18a, 18b, 18c, and 18d; however, real-world deployment of wireless client devices 14 in a WLAN 10 comprising one or more wireless AP devices 12 necessarily results in multipath reflections of wireless signals between the wireless AP device 12 and the wireless client devices 14, particularly in indoor deployments having various physical structures (walls, equipment, etc.) that can reflect the wireless signals. Hence, the multipath interference encountered in the WLAN 10 would likely interfere with the wireless AP device 12*a* being able to receive one or more of the wireless data units 24 transmitted within the resource units 18*a*, 18*b*, 18*c*, and/or 18*d*.

Hence, according to example embodiments, the wireless AP device 12*a* can transmit instructions that allocate the resource units 18*e*, 18*f*, 18*g*, and 18*h* to a wireless mirror device 16 (e.g., 16*a*). The allocation of the resource units 18*e* through resource unit 18*f* can cause the wireless mirror device 16*a* to provide temporal diversity, frequency diversity, and spatial diversity for the mirror transmissions 24' of the wireless data units 24 transmitted by the wireless client device 14*a* through 14*d* at the transmission interval 20*a*. Hence, the wireless mirror device 16*a* can respond to detection of one or more instructions allocating the resource unit 18*a* through resource unit 18*d* by detecting the respective wireless data units 24 transmitted at the transmission interval 20*a* at the respective frequencies 22*a* through 22*d*, and storing the received wireless data units 24 for mirror transmission 24' at the transmission interval 20*b* according to the resource units 18*e*, 18*f*, 18*g*, and 18*h* allocated by the wireless AP device 12*a*.

Hence, the wireless mirror device 16*a* can mirror transmit, at the transmission interval "$TS_{mir}$" 20*b*: the wireless data unit 24 received from "User 2" 14*b* (at the resource unit 18*b*) as a mirrored transmission 24' on the allocated frequency channel 22*a* allocated by the resource unit 18*e* ("User2 mir"); the wireless data unit 24 received from "User 3" 14*c* (at the resource unit 18*c*) as a mirrored transmission 24' on the allocated frequency channel 22*b* allocated by the resource unit 18*f* ("User3 mir"); the wireless data unit 24 received from "User 4" 14*d* (at the resource unit 18*d*) as a mirrored transmission 24' on the allocated frequency channel 22*c* allocated by the resource unit 18*g* ("User4 mir"); and the wireless data unit 24 received from "User 1" 14*a* (at the resource unit 18*a*) as a mirrored transmission 24' on the allocated frequency channel 22*d* allocated by the resource unit 18*h* ("User1 mir"). Hence, the wireless mirror device 16*a* can mitigate multipath interference between the wireless client devices 14*a*, 14*b*, 14*c*, and/or 14*d* and the associated wireless AP device 12*a* based on the mirror transmissions between the wireless AP device 12*a* and the one or more wireless client devices 14*a*, 14*b*, 14*c*, and 14*d* at the second transmission interval "$TS_{mir}$" 20*b*.

Although not shown in FIG. 2, the wireless AP device 12*a* also can transmit instructions that allocate additional resource units 18 to other wireless mirror devices 16 (e.g., 16*b*, 16*c*, and/or 16*d*) for non-interfering mirror transmissions 24' on different allocated frequency channels 22 at the transmission interval 20*b* (or another transmission interval 20, as appropriate). Hence, each wireless AP device 12 can transmit instructions that allocate resource units 18 for mirror transmissions 24' of the same wireless data unit 24 by different wireless mirror devices 16 on different allocated frequency channels 22. As described below, each wireless AP device 12 also can specify, on a per-flow basis and/or a per-wireless data unit basis, whether mirror transmission is needed, for example based on generating and outputting a trigger mirror instruction that causes one or more wireless mirror devices 16 to execute the mirror transmission.

Figure 3:
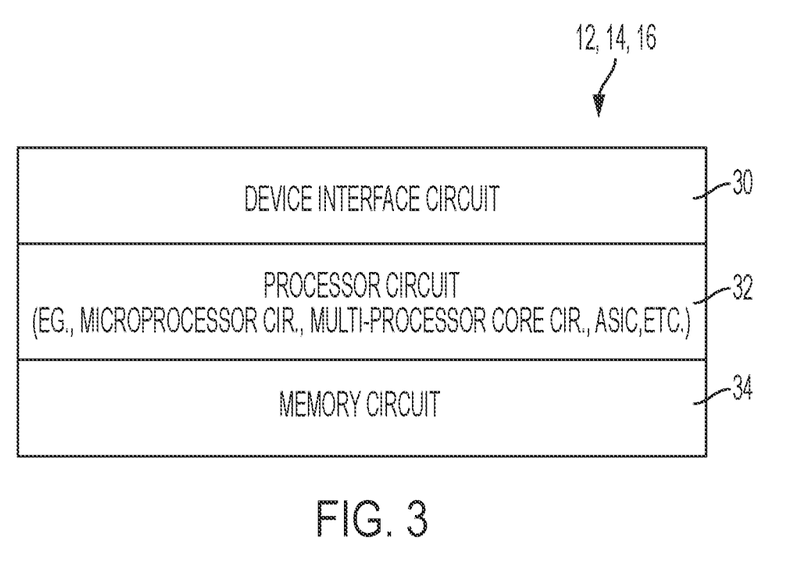
FIG. 3 illustrates an example implementation of any one of the devices of FIG. 1, according to an example embodiment.

FIG. 3 illustrates an example implementation of any one of the devices 12, 14, and/or 16 of FIG. 1, according to an example embodiment. Each apparatus 12, 14, 16 is a physical machine (i.e., a hardware device) configured for implementing network communications with other physical machines via the WLAN 10. The term "configured for" or "configured to" as used herein with respect to a specified operation refers to a device and/or machine that is physically constructed and arranged to perform the specified operation.

Each apparatus 12, 14, and/or 16 can include a device interface circuit 30, a processor circuit 32, and a memory circuit 34. The device interface circuit 30 can include one or more distinct physical layer transceivers for communication with any one of the other devices 12, 14, and/or 16; the device interface circuit 30 also can include an IEEE based Ethernet transceiver for communications with the devices of FIG. 1 via any type of data link, as appropriate (e.g., a wired or wireless link, an optical link, etc.); for example, the device interface circuit 30 of each wireless client device 14 and each wireless mirror device 16 can include one or more one or more IEEE 802.11 based wireless transceivers; in contrast the device interface circuit 30 of each wireless AP device 12 can include one or more IEEE 802.11 based wireless transceivers, a wired Ethernet transceiver, and/or an optical transceiver, etc. The processor circuit 32 can be configured for executing any of the operations described herein, and the memory circuit 34 can be configured for storing any data or data packets as described herein.

Any of the disclosed circuits of the devices 12, 14, and/or 16 (including the device interface circuit 30, the processor circuit 32, the memory circuit 34, and their associated components) can be implemented in multiple forms. Example implementations of the disclosed circuits include hardware logic that is implemented in a logic array such as a programmable logic array (PLA), a field programmable gate array (FPGA), or by mask programming of integrated circuits such as an application-specific integrated circuit (ASIC). Any of these circuits also can be implemented using a software-based executable resource that is executed by a corresponding internal processor circuit such as a microprocessor circuit (not shown) and implemented using one or more integrated circuits, where execution of executable code stored in an internal memory circuit (e.g., within the memory circuit 34) causes the integrated circuit(s) implementing the processor circuit to store application state variables in processor memory, creating an executable application resource (e.g., an application instance) that performs the operations of the circuit as described herein. Hence, use of the term "circuit" in this specification refers to both a hardware-based circuit implemented using one or more integrated circuits and that includes logic for performing the described operations, or a software-based circuit that includes a processor circuit (implemented using one or more integrated circuits), the processor circuit including a reserved portion of processor memory for storage of application state data and application variables that are modified by execution of the executable code by a processor circuit. The memory circuit 34 can be implemented, for example, using a non-volatile memory such as a programmable read only memory (PROM) or an EPROM, and/or a volatile memory such as a DRAM, etc.

Further, any reference to "outputting a message" or "outputting a packet" (or the like) can be implemented based on creating the message/packet in the form of a data structure and storing that data structure in a non-transitory tangible memory medium in the disclosed apparatus (e.g., in a transmit buffer). Any reference to "outputting a message" or "outputting a packet" (or the like) also can include electrically transmitting (e.g., via wired electric current or wireless electric field, as appropriate) the message/packet stored in the non-transitory tangible memory medium to another network node via a communications medium (e.g., a wired or wireless link, as appropriate) (optical transmission also can be used, as appropriate). Similarly, any reference to "receiving a message" or "receiving a packet" (or the like) can be implemented based on the disclosed apparatus detecting the electrical (or optical) transmission of the message/packet on the communications medium, and storing the detected transmission as a data structure in a non-transitory tangible memory medium in the disclosed apparatus (e.g., in a receive buffer). Also note that the memory circuit 34 can be implemented dynamically by the processor circuit 32, for example based on memory address assignment and partitioning executed by the processor circuit 32.

Figure 4A:
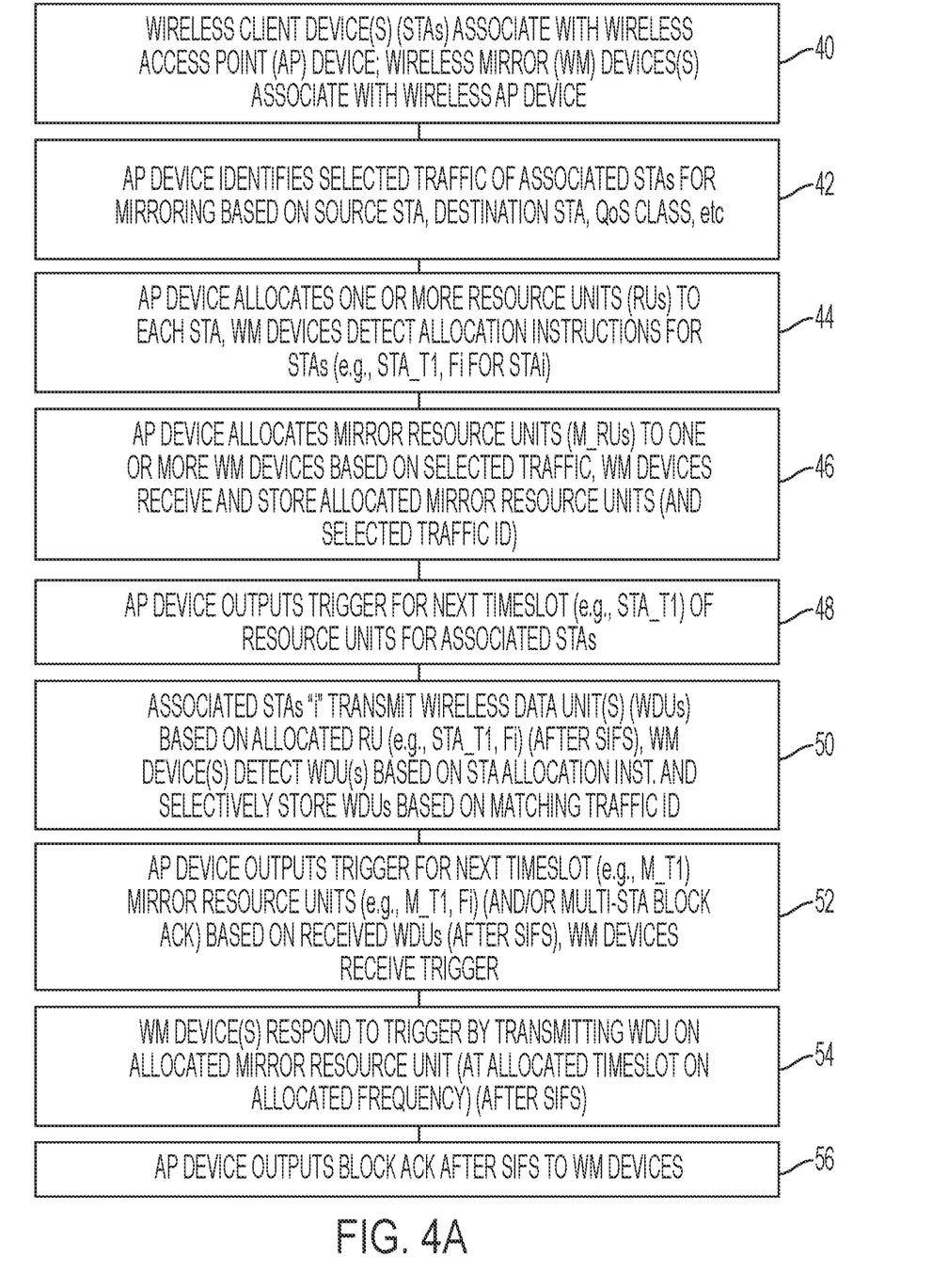
FIGS. 4A-4B illustrate a method of executing a mirror transmission by the wireless mirror device of FIG. 1, according to an example embodiment.
Figure 4B:
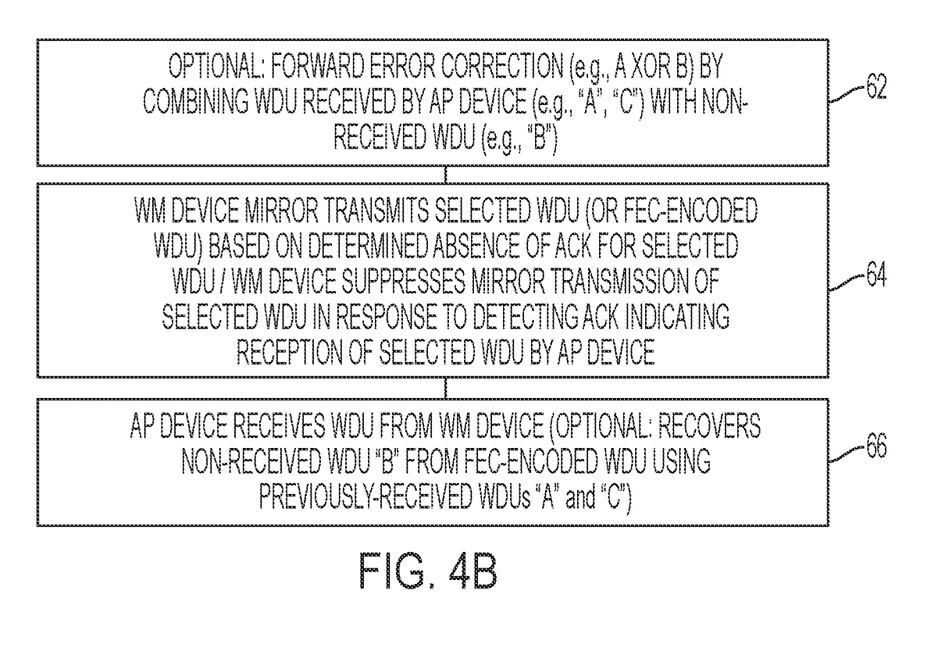

FIGS. 4A-4B illustrate a method of executing a mirror transmission by the wireless mirror device of FIG. 1, according to an example embodiment.

FIGS. 5A-5D illustrate variations in mirror transmissions by the wireless mirror device of FIG. 1, according to an example embodiment.

The operations described with respect to any of the Figures can be implemented as executable code stored on a computer or machine readable non-transitory tangible storage medium (i.e., one or more physical storage media such as a floppy disk, hard disk, ROM, EEPROM, nonvolatile RAM, CD-ROM, etc.) that are completed based on execution of the code by a processor circuit implemented using one or more integrated circuits; the operations described herein also can be implemented as executable logic that is encoded in one or more non-transitory tangible media for execution (e.g., programmable logic arrays or devices, field programmable gate arrays, programmable array logic, application specific integrated circuits, etc.). Hence, one or more non-transitory tangible media can be encoded with logic for execution by a machine, and when executed by the machine operable for the operations described herein.

In addition, the operations described with respect to any of the Figures can be performed in any suitable order, or at least some of the operations in parallel. Execution of the operations as described herein is by way of illustration only; as such, the operations do not necessarily need to be executed by the machine-based hardware components as described herein; to the contrary, other machine-based hardware components can be used to execute the disclosed operations in any appropriate order, or at least some of the operations in parallel.

Referring to FIG. 4A, the device interface circuit 30 (and or the processor circuit 32, as appropriate) of each wireless client device 14 in operation 40 can associate with an available wireless AP device 12 according to IEEE 802.11: as illustrated in FIG. 1, the wireless client devices 14a, 14b, 14c, and 14d can associate with the wireless AP device 12a, and the wireless client devices 14e and 14f can associate with the wireless AP device 12b.

Each wireless mirror device 16 can be physically positioned within the WLAN 10 at physical locations that could be susceptible to interference, poor reception, etc., in order to overcome poor reception quality between a wireless client device 14 and its associated wireless AP device 12. The device interface circuit 30 (and or the processor circuit 32, as appropriate) of each wireless mirror device 16 in operation 40 can associate with an available wireless AP device 12 according to IEEE 802.11, for example the wireless mirror devices 16a through 16d can associate with the wireless AP device 12a, and the wireless mirror devices 16e through 16h can associate with the wireless AP device 12b.

The processor circuit 32 of each wireless AP device 12 in operation 42 can identify at least a portion of selected link layer traffic of associated wireless client devices 14 requiring mirroring in order to ensure reliable reception of the selected layer traffic. The processor circuit 32 of each wireless AP device 12 can identify the selected link layer traffic according to various policies: in one example, all wireless data units 24 transmitted by a wireless client device 14 and/or a wireless AP device 12 can be selected for mirroring by one or more wireless mirror devices 16; alternately, a selected wireless data unit 24 can be identified for mirroring by one or more wireless mirror devices 16, for example based on an identity of a wireless client device 14, an identity of a wireless AP device 12, an identified traffic class (e.g., source/destination flow ID, QoS ID, etc.), in response to determined absence of an acknowledgment indicating successful receipt of a wireless data unit 24, etc.

The processor circuit 32 of each wireless AP device 12 in operation 42 also can identify that a mirror transmission 24' should be destined for a different wireless AP device 12 using MAC-in-MAC encapsulation. For example, the wireless AP device 12a can determine that the wireless mirror device 16c can reach the coverage area of the wireless AP device 12b (or at least the coverage area of its associated wireless mirror device 16e). Hence, the wireless AP device 12a can send an instruction to the wireless mirror device 16c to execute a mirror transmission 24' (destined for the wireless AP device 12b) of a wireless data unit 24 transmitted by a wireless client device 14b or 14c. The wireless AP devices 12a and 12b also can coordinate resource units 18, enabling the wireless AP device 12b and/or the wireless mirror device 16e (associated with the wireless AP device 12b) to detect a mirror transmission 24' by the wireless mirror device 16c of a wireless data unit 24 that was previously output by the wireless client device 14b or 14c and destined for the wireless AP device 12a.

The processor circuit 32 of each wireless AP device 12 (e.g., 12a) in operation 44 can allocate one or more resource units 18 (e.g., 18a through 18d) to each associated wireless client device 14 based on transmitting instructions for allocation of the resource units 18. Hence, the wireless client devices 14a, 14b, 14c, and 14d can detect that they are allocated the resource units 18a, 18b, 18c, and 18d, respectively, as illustrated in FIG. 2.

Any one or more of the wireless mirror (WM) devices 16a-16d in operation 44 also can receive the instructions indicating the allocation of the resource units 18a, 18b, 18c, and 18d to the wireless client devices 14a, 14b, 14c, and 14d, respectively, that can cause the one or more wireless mirror devices 16 to detect the link layer transmission of the wireless data unit 24 on the first allocated frequency channel 22 at the transmission interval 20a as identified by the allocated resource unit 18. The wireless AP device 12 (e.g., 12a) also can send instructions (e.g., either within the instructions allocating the resource units 18a through 18d or via separate instructions) that specify one or more wireless mirror devices 16 that are to listen for a wireless data unit 24 at the allocated frequency channel 22 at the transmission interval 20a as identified by the identified allocated resource unit 18; alternately, each wireless mirror device 16 can be configured for default detection ("snooping") on each of the resource unit 18 allocated by the associated wireless AP device 12.

The processor circuit 32 of the wireless AP device 12 (e.g., 12a) in operation 46 can allocate mirror resource units (M_RUs) 18e through 18h to one or more wireless mirror devices 16, for example based on the selected traffic identified by the wireless AP device 12 as requiring mirror transmissions 24'. As described previously with respect to FIG. 2, the processor circuit 32 of the wireless mirror device 16a in operation 46 can store in its memory circuit 34 the allocation instructions for the resource units 18a through 18*d* allocated for the wireless client devices 14*a* through 14*d* (causing the device interface circuit 30 and/or the processor circuit 32 to listen for one or more wireless data units 24 on the allocated frequency channels 22*a* through 22*d* at the first transmission interval "TS$_{tx}$" 20*a*); the processor circuit 32 of the wireless mirror device 16*a* in operation 46 also can store in its memory circuit 34 the instructions for the mirror resource units 18*e* through 18*h* to be used by the wireless mirror device 16*a* for the mirror transmission 24' on the respective allocated frequency channels 22*a* through 22*d* at the second transmission interval "TS$_{mir}$" 20*b*.

Figure 5A:
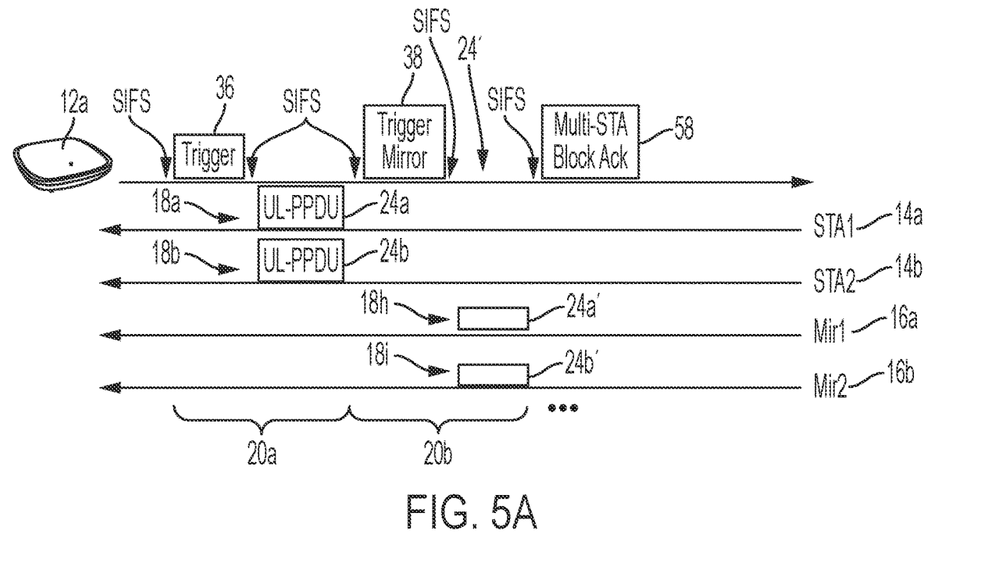
FIGS. 5A-5D illustrate variations in mirror transmissions by the wireless mirror device of FIG. 1, according to an example embodiment.

The processor circuit 32 of the wireless AP device 12*a* in operation 48 can cause its device interface circuit 30 to output a trigger frame (36 of FIG. 5A) that causes one or more wireless devices (e.g., 14*a*, 14*b*) to link layer transmit, in operation 50, a wireless data unit 24 to the wireless AP device 12*a* on an allocated frequency channel (e.g., 22*a*, 22*b*) at the first transmission interval "TS$_{tx}$" 20*a* as specified by the associated resource units 18*a* and 18*b* allocated to the respective wireless client devices 14*a* and 14*b*. As illustrated in FIG. 5A, the wireless client device 14*a* responds to the trigger frame 36 by transmitting in operation 50 a corresponding wireless data unit 24*a* (illustrated as an uplink PPDU (UL-PPDU)) at a corresponding allocated resource unit 18*a*; the wireless client device 14*b* responds to the trigger frame 36 by transmitting in operation 50 a corresponding wireless data unit 24*b* at a corresponding allocated resource unit 18*b*.

One or more of the wireless mirror devices 16 (e.g., 16*a* and 16*b*) having been assigned for mirror operations by the wireless AP device 12*a* also can detect in operation 50 the wireless data units 24 having been transmitted by the wireless client devices 14*a* and 14*b*, for example in response to the one or more wireless mirror devices 16 (e.g., 16*a* and 16*b*) having received one or more instructions for detecting the wireless data units 24 on the allocated resource units 18*a* and 18*b*. The processor circuit 32 of each of the "assigned" wireless mirror devices 16 (e.g., 16*a* and 16*b*) in operation 50 also can selectively store the received wireless data units 24 into its corresponding memory circuit 34 (e.g., within or distinct from the device interface circuit 30 or the processor circuit 32), for example based on determining that received wireless data unit 24 matches a prescribed policy or traffic identifier identified in one of the instructions from the wireless mirror device 16*a*.

The processor circuit 32 of the wireless AP device 12*a* in operation 52 can cause its device interface circuit 30 to output a trigger frame 38 for one or more of the wireless mirror devices 16 (e.g., 16*a* and 16*b* of FIG. 5A), also referred to as a "mirror trigger" 38, at the next transmission interval 20*b*. For example, the mirror trigger 38 is modified (relative to the trigger frame 36) to indicate the support for mirroring and to separate STA transmission time during interval 20*a* from mirror transmission time during interval 20*b*. Each assigned wireless mirror device 16 (e.g., 16*a* and 16*b*) can selectively respond to the trigger frame 38 in operation 54, for example based on a unicast and/or multicast mirror trigger 38 directed to one or more wireless mirror devices 16, or a broadcast mirror trigger 38 directed to all associated wireless mirror devices 16*a* through 16*d*, as appropriate.

As illustrated in FIG. 5A, the processor circuit 32 of the wireless mirror device 16*a* can be configured for causing in operation 54 its device interface circuit 30 to transmit in the resource unit 18*h* a mirrored transmission 24*a*' of the wireless data unit 24*a* transmitted by the wireless client device 14*a* in the resource unit 18*a*; the processor circuit 32 of the wireless mirror device 16*b* can be configured for causing in operation 54 its device interface circuit 30 to transmit in the resource unit 18*i* (not shown in FIG. 2) a mirrored transmission 24*b*' of the wireless data unit 24*b* transmitted by the wireless client device 14*b* in the resource unit 18*b*. As described previously, the wireless mirror devices 16*a* and 16*b* can selectively execute the mirrored transmissions 24*a*' and 24*b*', respectively, based on previously-received instructions specifying the wireless mirror device 16*a* is to execute mirrored transmissions of a wireless data unit 24*a* originated by the wireless client device 14*a*, and further specifying the wireless mirror device 16*b* is to execute mirrored transmissions of a wireless data unit 24*b* originated by the wireless client device 14*b*; other instructions can be sent by the wireless AP device 12 for mirrored transmissions based on, for example, the relative positions of the wireless mirror devices 16 relative to the wireless client devices 14.

The processor circuit 32 of the wireless AP device 12*a* in operation 56 can respond to the mirror transmissions 24*a*' and 24*b*' by generating and outputting a multi-STA block acknowledgment 58 acknowledging receipt of the mirror transmissions 24*a*' and 24*b*'. As illustrated in FIGS. 5A-5D, each transmission is separated by a Short Interframe Spacing (SIFS) in accordance with IEEE 802.11.

Hence, as illustrated in FIG. 5A, each wireless mirror device 16 can be assigned to a specific wireless client device 14, for example the wireless mirror device 16*a* is assigned to the wireless client device 14*a*, the wireless mirror device 16*b* is assigned to the wireless client device 14*b*, etc. As apparent from the foregoing, the example embodiment does not prevent the mixing of mirrored traffic 24' and non-mirrored traffic 24 within the same transmission interval 20 but on different allocated frequency channels 22.

Figure 5B:
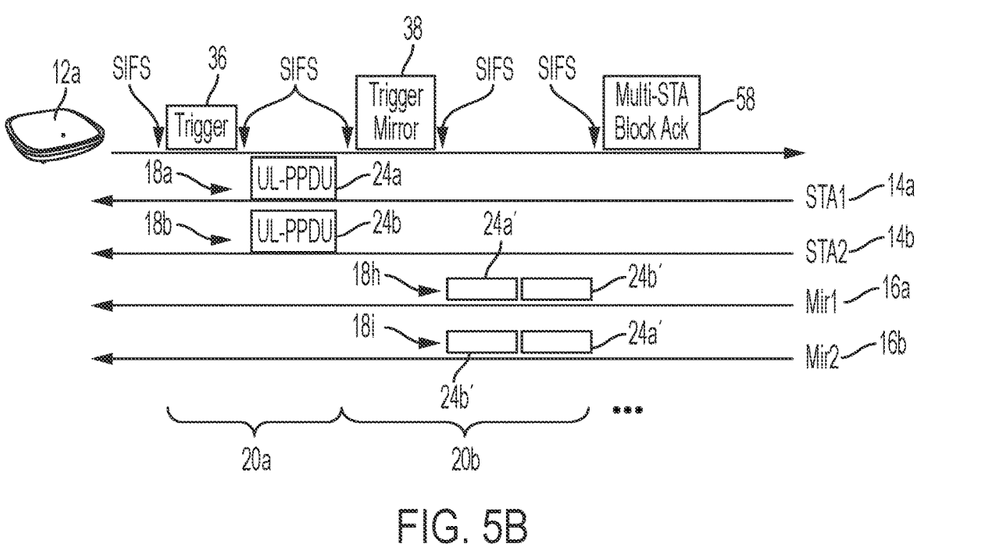

FIG. 5B illustrates a variation of FIGS. 4A and 5A, where the wireless AP device 12*a* can generate and send to the wireless client devices 14*a* and 14*b* instructions for sending a sequence of mirrored transmissions 24' ordered based on preference, where the wireless mirror device 16*a* can receive instructions for mirrored transmissions according to the STA preference 14*a* then 14*b*, whereas the wireless mirror device 16*b* can receive instructions for mirrored transmissions according to the STA preference 14*b* then 14*a*. Hence, the processor circuit 32 of the wireless mirror device 16*a* can order the mirror transmissions 24*a*' then 24*b*' for transmission in the resource unit 18*h*, and the processor circuit 32 of the wireless mirror device 16*b* can order the mirror transmissions 24*b*' then 24*a*' in the resource unit 18*i*, providing additional temporal diversity, spatial diversity, and spatial diversity due to the different sequences of mirrored transmissions for even higher reliability in reception by the wireless AP device 12*a*. The wireless AP device 12 can respond to the different sequences of mirrored transmissions by transmitting the block acknowledgment 58.

Figure 5C:
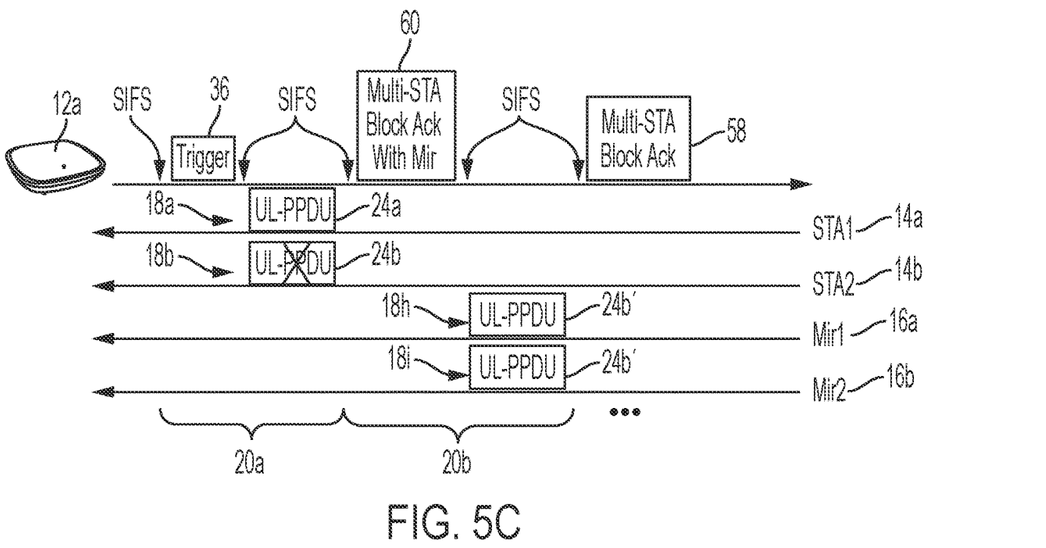
Figure 5D:
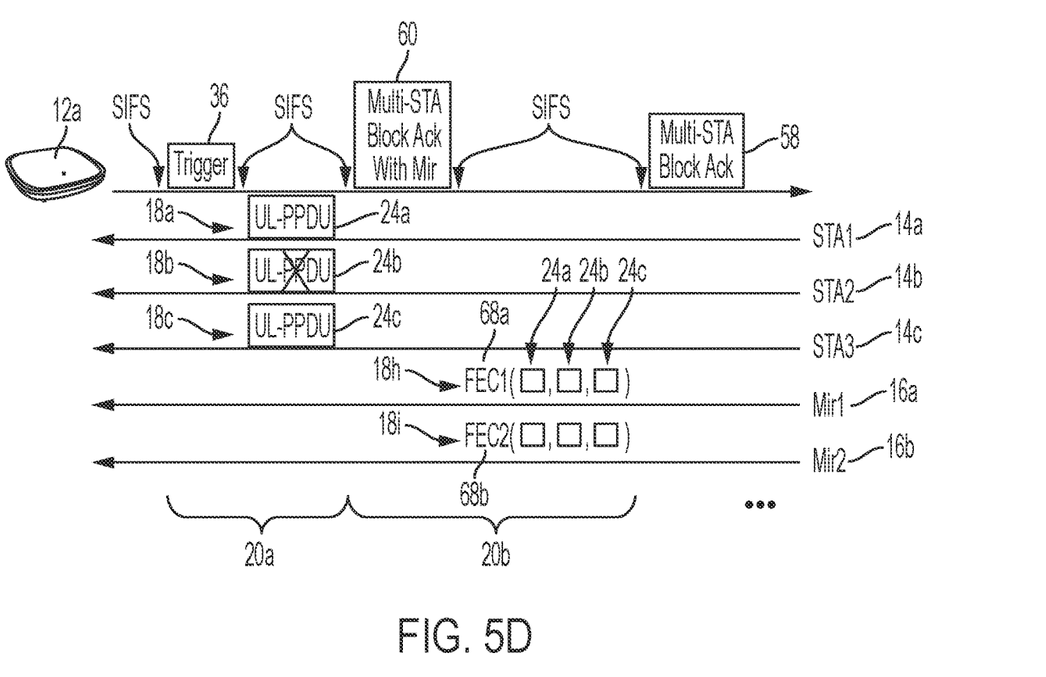

FIGS. 4B, 5C and 5D illustrate variations of operation 54 in FIG. 4A of selective transmission of a mirror transmission 24', according to an example embodiment. FIG. 5C illustrates a selective transmission of a mirror transmission 24*b*' based on a determined absence of an acknowledgment for a wireless data unit 24*b*, according to an example embodiment. In particular, the mirror trigger 38 in FIGS. 5A and 5B is replaced with a block acknowledgment-with-mirror-trigger 60 of a wireless data unit 24*a* that was received by the wireless AP device 12*a*; in other words, the block acknowledgment-with-mirror-trigger 60 can indicate receipt of the wireless data unit 24*a*, but will not have any indication of any reception of the wireless data unit 24*b*, indicated by the "X" through the wireless data unit 24*b* in FIG. 5C.

As described previously, the wireless mirror devices 16a and 16b can be configured for receiving the wireless data unit 24b during the resource unit 18b. Hence, the wireless mirror devices 16a and 16b can be configured (e.g., based on prior instructions from the wireless AP device 12a) to respond to the block acknowledgment-with-mirror-trigger 60 (indicating reception of the wireless data unit 24a and triggering of the wireless mirror devices 16) by mirror transmitting the mirror transmission 24b' using the respective allocated resource units 18h and 18i, based on a determined absence in the block acknowledgment-with-mirror-trigger 60 of any acknowledgement of the wireless AP device 12a receiving the missing wireless data unit 24b. In other words, the wireless mirror devices 16a and 16b can mirror transmit the mirror transmission 24b' in response to a determined absence of the wireless AP device 12a receiving the corresponding wireless data unit 24b, while suppressing mirror transmission of the wireless data unit 24a in response to detecting corresponding acknowledgment in the block acknowledgment-with-mirror-trigger 60 (see operation 64 of FIG. 4B). Hence, the wireless mirror devices 16a and 16b can be configured for mirror transmitting only the wireless data unit 24b that was not acknowledged in the block acknowledgment-with-mirror-trigger 60.

FIG. 5D illustrates mirror transmission of a wireless data unit 24 based on forward error correction in operation 62 of a "missing" (i.e., non-received) wireless data unit 24b (illustrated by the "X" in FIG. 5D) that was not received by the wireless AP device 12a. As illustrated in FIG. 5D, the wireless AP device 12 can receive the wireless data unit 24a (transmitted by the wireless client device 14a based on the resource unit 18a) and the wireless data unit 24c (transmitted by the wireless client device 14c based on the resource unit 18c), but is unable to receive the wireless data unit 24b transmitted based on the resource unit 18b, for example based on multipath interference. In contrast, the wireless mirror devices 16a and 16b can detect and store the wireless data units 24a, 24b, and 24c during the transmission interval 20a, based on the previous instructions from the wireless AP device 12a specifying the resource units 18a, 18b, and 18c, and the use of FEC for mirror transmissions. Hence, the processor circuit 32 of each of the wireless mirror devices 16a and 16b in operation 62 of FIG. 4B can generate a forward error correction (FEC) data structure 68 based on the received wireless data units 24a, 24b, and 24c. The FEC-encoded data structure 68 can be implemented, for example, using an Exclusive-OR (XOR) operation, or another forward encoding technique, as appropriate.

Hence, each wireless mirror device 16a and 16b in operation 64 can output the corresponding FEC-encoded data structure 68a and 68b during the transmission interval 20b in response to detecting the block acknowledgment-with-mirror-trigger 60; as described previously, the block acknowledgment-with-mirror-trigger 60 can identify the wireless data units 24 that have been received by the wireless AP device 12 (e.g., 24a and 24c). The wireless AP device 12a in operation 66 can respond to reception of the FEC-encoded data structures 68a and 68b by recovering the wireless data unit 24b using the previously-received wireless data units 24a and 24c, and generating and outputting a block acknowledgment 58 indicating reception of the FEC-encoded data structure 68a and 68b.

According to example embodiments, wireless mirror devices can be deployed within a WLAN for mirror transmissions between a wireless AP device and one or more wireless client devices associated with the wireless AP devices, in order to provide temporal diversity, frequency diversity, and spatial diversity in link layer wireless transmissions. The multi-dimensional diversity provided by the wireless mirror devices can mitigate against any multipath interference encountered during the link layer transmissions between a wireless client device and its associated AP device. The wireless mirror devices can provide increased stability and reliability of link layer transmissions, based on coordinated instructions from the wireless AP device, without any impact on network layer routing topologies or routing protocols.

Although the above examples have been described in connection with a wireless AP device 12 allocating resource units for mirror transmission by a wireless mirror device 16 of a wireless data unit transmitted from a wireless client device 14 to a wireless AP device 12, the above examples also an be applied to a wireless AP device 12 allocating resource units for mirror transmission by a wireless mirror device 16 of a wireless data unit transmitted from a wireless AP device 12 to a wireless client device 14. Hence, any reference to a link layer transmission of a wireless data unit "between" a wireless access point (AP) device and a wireless client device encompasses any one or more of a link layer transmission from a wireless AP device 12 to a wireless client device 14, or a link layer transmission from a wireless client device 14 to its associated wireless AP device 12; in other words, use of the term "between" in this specification and claims is equivalent to "to/from". Hence, the example embodiments can be applied for mitigating against multipath interference encountered by wireless data traffic from a wireless AP device 12 to one or more of its associated wireless client devices 14.

While the example embodiments in the present disclosure have been described in connection with what is presently considered to be the best mode for carrying out the subject matter specified in the appended claims, it is to be understood that the example embodiments are only illustrative, and are not to restrict the subject matter specified in the appended claims.

What is claimed is:

1. A method comprising:
   detecting, by a wireless mirror device in a wireless data network, link layer transmission of a wireless data unit between a wireless access point (AP) device and a wireless client device on a first allocated frequency channel at a first transmission interval; and
   transmitting, by the wireless mirror device based on detecting the link layer transmission, the wireless data unit at a second transmission interval on a second allocated frequency channel that is allocated to the wireless mirror device for a mirror transmission between the wireless AP device and the wireless client device at the second transmission interval,
   wherein the transmitting is based on a determined absence of an acknowledgment indicating reception by the wireless AP device of the wireless data unit, the method further comprising:
   receiving a second wireless data unit on a corresponding third allocated frequency channel during the first transmission interval;
   determining the second wireless data unit is received by the wireless AP device;
   encoding the wireless data unit with the second wireless data unit; and
   the transmitting of the wireless data unit based on encoding the wireless data unit with the second wireless data unit, enabling the wireless AP device to recover the wireless data unit based on the reception of the second wireless data unit by the wireless AP device.

2. The method of claim 1, wherein the wireless mirror device is not a wireless AP device or a wireless client device.

3. The method of claim 1, further comprising:
receiving a trigger frame following the first transmission interval from the wireless AP device;
the transmitting including the wireless mirror device transmitting the wireless data unit to the wireless AP device, at the second transmission interval, in response to the trigger frame.

4. The method of claim 1, further comprising:
receiving, by the wireless mirror device, a first instruction from the wireless AP device for detecting a transmission on the first allocated frequency channel at the first transmission interval, wherein the detecting of the wireless data unit is based on the first instruction; and
receiving, by the wireless mirror device, a second instruction from the wireless AP device identifying the second allocated frequency channel and the second transmission interval for the mirror transmission, wherein the transmitting of the wireless data unit to the wireless AP device by the wireless mirror device is based on the second instruction.

5. The method of claim 4, further comprising:
receiving, by the wireless mirror device, a third instruction from the wireless AP device identifying a third allocated frequency channel at the first transmission interval;
detecting, by the wireless mirror device, a second wireless data unit transmitted by a second wireless client device for the wireless AP device on the third allocated frequency channel at the first transmission interval; and
selectively transmitting, by the wireless mirror device, the second wireless data unit to the wireless AP device during the second transmission interval on the second allocated frequency channel based on the second instruction.

6. The method of claim 5, wherein the selectively transmitting includes suppressing transmission of the second wireless data unit during the second transmission interval in response to detecting an acknowledgment from the wireless AP device indicating reception of the second wireless data unit.

7. The method of claim 1, wherein the transmitting enables the wireless mirror device to mitigate against any multipath interference encountered between the wireless client device and the wireless AP device.

8. An apparatus implemented as a physical machine, the apparatus comprising:
a device interface circuit configured for detecting link layer transmission of a wireless data unit between a wireless access point (AP) device and a wireless client device on a first allocated channel at a first transmission interval in a wireless data network; and
a processor circuit configured for causing the device interface circuit to transmit, based on detecting the link layer transmission, the wireless data unit at a second transmission interval on a second allocated frequency channel that is allocated to the apparatus for a mirror transmission between the wireless AP device and the wireless client device at the second transmission interval,
wherein the processor circuit is configured for causing transmission of the wireless data unit based on a determined absence of an acknowledgment indicating reception by the wireless AP device of the wireless data unit, and wherein:
the device interface circuit is configured for receiving a second wireless data unit on a corresponding third allocated frequency channel during the first transmission interval;
the processor circuit is configured for determining the second wireless data unit is received by the wireless AP device;
the processor circuit is configured for encoding the wireless data unit with the second wireless data unit; and
the processor circuit is configured for causing the device interface circuit to transmit the wireless data unit based on encoding the wireless data unit with the second wireless data unit, enabling the wireless AP device to recover the wireless data unit based on the reception of the second wireless data unit by the wireless AP device.

9. The apparatus of claim 8, wherein the apparatus is not a wireless AP device or a wireless client device.

10. The apparatus of claim 8, wherein:
the device interface circuit is configured for receiving a trigger frame following the first transmission interval from the wireless AP device;
the processor circuit is configured for causing the device interface circuit to transmit the wireless data unit to the wireless AP device, at the second transmission interval, in response to the trigger frame.

11. The apparatus of claim 8, wherein:
the device interface circuit is configured for receiving first and second instructions from the wireless AP device;
the processor circuit is configured for causing the device interface circuit to detect the wireless data unit on the first allocated frequency channel at the first transmission interval based on the first instruction; and
the processor circuit is configured for causing the device interface circuit to transmit the wireless data unit to the wireless AP device on the second allocated frequency channel at the second transmission interval based on the second instruction.

12. The apparatus of claim 11, wherein:
the device interface circuit is configured for receiving a third instruction from the wireless AP device, the third instruction identifying a third allocated frequency channel at the first transmission interval;
the processor circuit is configured for causing the device interface circuit to detect a second wireless data unit transmitted by a second wireless client device for the wireless AP device on the third allocated frequency channel at the first transmission interval; and
the processor circuit is configured for selectively causing the device interface circuit to transmit the second wireless data unit to the wireless AP device during the second transmission interval on the second allocated frequency channel based on the second instruction.

13. The apparatus of claim 12, wherein the processor circuit is configured for suppressing transmission of the second wireless data unit during the second transmission interval in response to detecting an acknowledgment from the wireless AP device indicating reception of the second wireless data unit.

14. The apparatus of claim 8, wherein the transmitting of the wireless data unit enables the apparatus to mitigate against any multipath interference encountered between the wireless client device and the wireless AP device.

15. One or more non-transitory tangible media encoded with logic for execution by a machine and when executed by the machine operable for:
  detecting, by the machine implemented as a wireless mirror device in a wireless data network, link layer transmission of a wireless data unit between a wireless access point (AP) device and a wireless client device on a first allocated frequency channel at a first transmission interval; and
  transmitting, by the wireless mirror device based on detecting the link layer transmission, the wireless data unit at a second transmission interval on a second allocated frequency channel that is allocated to the wireless mirror device for a mirror transmission between the wireless AP device and the wireless client device at the second transmission interval,
  wherein the transmitting is based on a determined absence of an acknowledgment indicating reception by the wireless AP device of the wireless data unit, the method further comprising:
  receiving a second wireless data unit on a corresponding third allocated frequency channel during the first transmission interval;
  determining the second wireless data unit is received by the wireless AP device;
  encoding the wireless data unit with the second wireless data unit; and
  the transmitting of the wireless data unit based on encoding the wireless data unit with the second wireless data unit, enabling the wireless AP device to recover the wireless data unit based on the reception of the second wireless data unit by the wireless AP device.

16. The one or more non-transitory tangible media of claim 15, wherein the wireless mirror device is not a wireless AP device or a wireless client device.

* * * * *